Jan. 6, 1970     P. GOLDBERG ET AL     3,488,222

THERMALLY-ACTIVATED GALVANIC CELL

Filed July 21, 1966

INVENTORS.
PAUL GOLDBERG
NICHOLAS J. MASKALICK

BY R. J. Frank
ATTORNEY.

United States Patent Office 3,488,222
Patented Jan. 6, 1970

3,488,222
THERMALLY-ACTIVATED GALVANIC CELL
Paul Goldberg, Lido Beach, and Nicholas J. Maskalick, Old Bethpage, N.Y., assignors to General Telephone & Electronics Laboratories Incorporated, a corporation of Delaware
Filed July 21, 1966, Ser. No. 566,854
Int. Cl. H01m 27/22
U.S. Cl. 136—83
11 Claims

ABSTRACT OF THE DISCLOSURE

A thermally-activated galvanic cell comprising a zirconium anode, an electrolyte formed of an oxide system having a cubic fluoride structure and an oxygen ion-supplying cathode. The cell is activated at about 400° C. and has a relatively high internal resistance at room temperature with a decreased resistance at the activation temperature.

---

This invention relates to thermally-activated galvanic cells and, more particularly, to galvanic cells capable of thermal activation at temperatures of approximately 400° C.

A thermally-activated galvanic cell generates an electric current by a chemical reaction which takes place when the temperature of the cell reaches a particular level. Typically, the cell comprises three elements; an anode, a cathode and an electrolyte therebetween. The anode is a consumable electrode in that its chemical composition is altered as the reaction proceeds. The cathode may be either a consumable or a non-consumable electrode. In the latter case, the cathode material assumes no apparent role in the chemical reaction other than acting as a supplier of active material for the reaction. This material may be either adsorbed on the cathode, transported through a porous cathode or a combination thereof may be employed.

In both cases, an electrolyte is interposed between the anode and the cathode. The electrolyte is formed of a material in which the electrical conduction is essentially ionic. This type of conduction, as opposed to electronic conduction, is characterized by a high anion transport number for the electrolyte material. The anion transport number is equal to the fraction of the electric current attributable to the migration of anions through the material. For galvanic cells employing a solid electrolyte, the electrolyte material is selected such that its anion transport number is substantially one. As a result, the electronic conduction of the cell when activated occurs through an external circuit rather than through the electrolyte and the occurrence of internal short circuits within the cell is substantially eliminated.

The increasing interest in the development of compact, lightweight power sources has resulted, in part, from the power source needs of space, missile and other military devices. The characteristics desired in these applications of galvanic cells are reliability with respect to internal shorting, long-term storage periods without an accompanying degradation in performance, high power and energy outputs per unit weight and volume, good mechanical properties, and low operating temperatures.

While thermally-activated galvanic cells with relatively long shelf life and high current density are known, these cells have required relatively high operating temperatures, within the range of 600 to 1000° C., to activate the cell. The electrolyte employed therein may be formed of glass which is brittle and mechanically unsatisfactory under operating conditions. In addition, the reduction of the thickness of the glass electrolyte to decrease the weight and volume of the cell and lower the amount of thermal energy required for activation has been found to further degrade the mechanical properties of the cell. Also, the glass electrolyte has been found to result in interal short circuits which reduce the electrical energy externally available.

Accordingly, an object of the present invention is to provide a thin film galvanic cell which is activated at a temperature of approximately 400° C.

Another object is the provision of a thin film galvanic cell which may be rapidly activated.

A further object is to provide a thin film galvanic cell having improved mechanical properties, reliability and shelf-life.

Still another object is to provide a galvanic cell having a relatively high internal resistance at room temperatures and a relatively low internal resistance at the activation temperature.

In accordance with the present invention, a galvanic cell is provided which comprises an anode electrode containing zirconium as the primary active element, an oxygen-supplying cathode electrode and a solid electrolyte interposed therebetween. The electrolyte is a thin film of an oxide system having the particular crystallographic form known as the fluorite structure and an anion transport number of substantially one. The cell is activated by the application of heat sufficient to raise its temperature to about 400° C. whereupon an electrochemical reaction takes place to generate electrical energy.

The anode electrode, containing zirconium, is a consumable electrode in that the zirconium is oxidized when the cell is activated. The oxygen ions are transported through the electrolyte to the anode whereupon the electrochemical reaction occurring releases electrons which result in an electrical current flowing through an external circuit coupled between the anode and the cathode.

The electrolyte is a thin film formed on the anode and is an oxide system characterized by the crystallographic form known as the fluoride structure. The fluoride structure is cubic and has a space group of $O_h^5$. In addition, the electrolyte material having this structure is required to have an anion transport number of substantially one so that conduction through the electrolyte is ionic rather than electronic. As a result, the present galvanic cell displays essentially no self-discharge during open circuit storage. Further, a direct shorting of the cell at room temperatures, i.e. about 25° C., is found not to discharge it due to its intrinsically high electronic resistance.

When the temperature of the cell is increased, the resistivity $\rho$ of the electrolyte decreases in accordance with its temperature coefficient of resistivity. The resistance R of the electrolyte is determined in accordance with the following formula.

$$R = \rho \frac{L}{A}$$

wherein L is the thickness of the electrolyte or, in other words, the length of the electrical path between the cathode and anode electrodes, and A is the area of the electrolyte. At 400° C., the resistivity $\rho$ of an electrolyte having the aforementioned fluorite structure is such that thin film electrolytes having thicknesses of the order of microns exhibit resistances R which are low enough to permit the electrochemical reaction to proceed at a relatively rapid rate. For example, a thin film electrolyte having a thickness of 1 micron with an electrode area of 1 cm.$^2$ is found to contribute less than 1 ohm to the internal resistance of the cell at 400° C. This amount of electrolyte resistance corresponds to an ohmic loss of less than 0.001 volt/ma./cm.$^2$ for an electromotive force propagating a discharge through the electrolyte and thereby provides efficient operation.

The thermal activation time for the galvanic cell is essentially determined by the time required to bring the solid electrolyte to operating temperature. The use of thin electrolyte films decreases this time since they possess a relatively low mass and a high surface to volume ratio.

The oxygen-supplying cathode electrode is preferably a thin film to provide a compact, lightweight cell and for ease of fabrication. The cathode may be formed of a noble metal, such as platinum or silver, with the cell utilizing the oxygen desorbed therefrom and from nearby surfaces upon activation. Where operating conditions permit, the cathode may be supplied with oxygen during operation. Also, for applications wherein a metal cathode will not have oxygen available during operation, an oxygen generating substance such as $MoO_3$, $Ag_2O$, or $PbO_2$ may be applied over the cathode. Alternatively, cathodes composed principally of ceramic-metal composites (cermets), such as mixtures of the above oxides with their "parent" metals as well as Fe-FeO or Ni-NiO blends and the like, may be employed.

The anode electrode of the present cell is required to be conductive and readily oxidizable at temperatures of about 400° C. Further, the anode must be compatible with the eletcrolyte both during operation and during the formation of the thin film electrolyte thereon. These and other advantages are provided by fabricating the anode electrode of zirconium or a mixture thereof. The primary electrochemical reaction taking place is the oxidation of the zirconium which, due to the high position of zirconium in the electromotive force series, results in the generation of a relatively high voltage. The zirconium-oxygen couple has been found to be particularly well-suited to the generation of electrical power at the relatively low temperature of 400° C.

As mentioned previously, the anode electrode is in intimate contact with the electrolyte and must be compatible therewith so that the properties of the electrolye are essentially unchanged by the anode electrode. The electrolyte is an oxide system, typically a mixture of zirconia and yttria, which may lose oxygen atoms to the anode electrode. This loss of oxygen atoms is due primarily to the fact that the anode contains readily oxidizable material and, as a result, oxygen atoms are lost thereto by the electrolyte. This may result in a substantial decrease in the anion transport characteristic of the portion of the electrolyte proximate to the anode and degrade the cell performance. It has been found that this change in electrolyte properties is essentially eliminated by dissolving oxygen in the anode electrode prior to the formation of the anode-electrolyte interface. The anode electrode may be saturated with oxygen, and, in practice, dissolving 30 atomic percent of oxygen in the anode is preferred.

Two general techniques may be used in the formation of the thin film electrolyte on the anode; direct anodization of the anode or sputtering the electrolyte on the anode surface. In the case of anodization, the anode electrode is formed of a mixture of zirconium and the particular element or elements used to form the fluorite structure electrolyte. The electrolyte may be either a binary oxide system, such as zirconia-yttria or zirconia-calcia, or a ternary oxide system, such as zirconia, calcia, and yttria, exhibiting the cubic fluorite structure and having an anion transport number greater than 0.95.

In the case of sputtered electrolyte films, the anode may be comprised of pure zirconium. However for both sputtered and anodic films, the anode electrode is preferably formed of a mixture of zirconium and the other oxidizable constituent or constituents (e.g. calcium and/or yttrium) of the electrolyte. The mixture ideally is selected to have the same composition as the electrolyte, such that the weight percent of the constituents of the mixture are the same as that of the electrolyte. By so forming the anode, the increase in internal resistance of the cell during operation is decreased so that dissipative ohmic heating effects are similarly decreased. This advantage is believed to arise from the tendency of the reaction products to assume the low resistance cubic structure of the electrolyte, rather than a high resistance monoclinic structure. In addition, anode electrodes having a mixed composition may have oxygen dissolved therein, as previously mentioned, to essentially eliminate any migration of oxygen atoms from the electrolyte.

All three basic components of the present invention are fabricated so as to form a laminated structure. The anode electrode, if relatively thick, provides the mechanical support for the individual cells. Upon the surface of the anode, the thin film electrolyte is applied. The cathode, which may also be a thin film, is formed on the electrolyte. Alternatively, the electrolyte itself may serve as the supporting membrane for subsequently applied electrodes. The geometry of the overall cell may be any desired form, such as cylindrical, spherical, flat or rippled.

Further features and advantages of the invention will become more readily apparent from the following detailed description of a specific embodiment when taken in conjunction with the accompanying drawings, in which.

Figure 1:
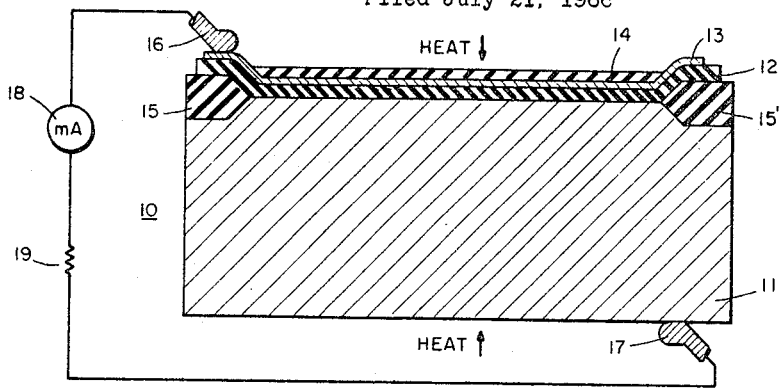
FIG. 1 is a side view in section of one embodiment of the invention.

Referring now to FIG. 1, a galvanic cell 10 is shown comprising generally an anode electrode 11, an electrolyte 12 formed thereon and a cathode electrode 13 contacting the electrolyte. In addition, a layer of oxygen-generating material 14 is provided on the upper surface of cathode 13.

The anode electrode 11 is formed of zirconium or a zirconium-containing mixture. The thickness and area of the anode are determined by the desired cell geometry. In addition, the thickness of the anode it selected such that is provides mechanical support for the cell. A typical anode thickness is within the 25 to 30 micron range. However, the electrolyte membrane may be utilized as the support element if desired. Also, a portion of the upper edge of the anode is shown removed and barrier layers 15 and 15' are formed thereon. These barrier layers are preferably formed of oxides of the anode material and are provided for the support of edge contact 16. However, the supports 15, 15' may be omitted if desired.

The electrolyte is formed of an oxide system having the cubic fluorite structure and an anion transport number of substantially one. Typical systems are the zirconia-yttria system $(ZrO_2)_x(Y_2O_3)_{1-x}$, the zirconia-calcia system $(ZrO_2)_x(CaO)_{1-x}$ or the zirconia-yttria-calcia system $(ZrO_2)_x[(Y_2O_3)(CaO)]_{1-x}$ in which $x$ is within the mole ratio range of 0.95 to 0.65 mole percent. The anion transport number for these materials is in excess of 0.95. In practice, the resistivity of the electrolyte system is found to be minimized for $x$ within the mole ratio range of 0.95 to 0.85. While the above oxide systems have been specifically referred to, other binary and ternary oxide systems having the prescribed cubic fluorite structure and anion transport number, such as the thoria-yttria, ceria-lanthana and hafnia-calcia systems, may be employed.

Cathode electrode 13 is formed on the surface of electrolye 12 and may also be a thin film. The cathode acts as a supplier of oxygen in the cell and may be formed of noble metal having oxygen adsorbed thereon. In the embodiment of FIG. 1, a thin film of platinum comprises cathode 13 and, as a further supply of oxygen, a layer 14 of oxygen-donating material such as $Ag_2O$ or $MoO_3$ is deposited thereover. Alternatively, cathode 13 may be formed of a conductive material which releases oxygen at the operating temperature, for example Cu or Ni blended with suitable quantities of oxides derived therefrom, or of oxides of Mo, Fe, Co, Ag, and the like and oxygen-donating layer 14 may be omitted.

The galvanic cell 10 is activated by the application of heat thereto sufficient to raise its temperature to about 400° C. The amount of heat and the time required for the cell to be activated is determined primarily by the mass of the cell. To provide efficient and rapid activation, the thickness of the electrolyte film is chosen to be about 4 microns and the thickness of the cathode is of the order of 0.2 micron. In addition, the layer of oxygen-donating material, if provided, may be within the range of 1 to 10 microns in thickness. The anode and cathode contacts for the cell may be either weld or compression contacts and formed of gold, aluminum, copper or the like.

When the cell is activated, oxygen is supplied from the cathode and the oxygen anions are transported through the electrolyte to the anode whereupon they combine with the zirconium in the anode. The primary electrochemical reaction taking place is the oxidation of the zirconium.

Figure 4:
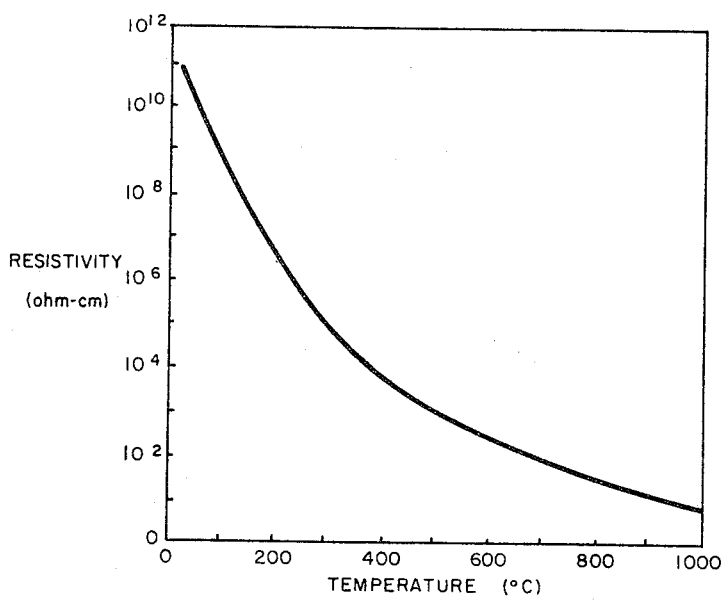
FIG. 4 is a curve showing the variation in resistivity with temperature for the electrolyte of the embodiment of FIG. 1.

The cell is required to exhibit a low resistivity at the relatively low operating temperature of 400° C. so that the energy lost due to internal heating is minimized. The curve of FIG. 4 shows the variation in resistivity with temperature for a zirconia-yttria electrolyte having the composition of $(ZrO_2)_{0.9}(Y_2O_3)_{0.1}$. It shall be noted that the resistivity decreases by approximately $10^7$ ohm-cm. when the electrolyte temperature is increased to 400° C. As a result a 4 micron electrolyte film having an area of 1 cm.$^2$ contributes less than 4 ohms to the internal resistance of the cell at 400° C.

As the electrochemical reaction proceeds within the cell, anodic oxides are formed at the interface between the anode and the electrolyte. These oxides build up during discharge and contribute to an increasing internal cell resistance so that ohmic heating during the passage of discharge current becomes an increasingly significant factor limiting cell performance to the level of internal power dissipation tolerable in a particular application. However, the anodic oxide reaction products in the present cell are found to be reduced somewhat for embodiments utilizing an anode comprised of a zirconium mixture. This advantage is believed to be due to the formation of a low resistance cubic crystalline structure reaction product rather than a high resistance monoclinic structure. The stabilized cubic fluorite structure of the electrolyte, at least initially, influences the crystal structure of the anodic oxide reaction product so that it possesses a cubic crystal structure.

The thin electrolyte film having the prescribed crystal structure may be formed on the anode electrode by direct anodization or by sputtering. In the anodization process, the anode electrode is formed of a mixture of zirconium and the other constituents of the oxide system of the electrolyte, e.g. yttrium or calcium. The composition of the anode mixture is chosen so that the relative proportions, i.e. weight percent, of materials are those desired in the electrolyte film. The anode is then placed in an electrolytic bath such as a solution of ammonium borate. When a current is caused to flow between the anode and a working cathode, the electrolyte film is formed.

In the formation of a sputtered electrolyte film, the anode is typically formed of a mixture of zirconium and the other constituents of the electrolyte and a layer of the appropriate oxide system is sputtered thereon by conventional techniques. For example, a sputtering electrode is formed of a mixture of zirconium and dispersed calcia or yttria having the appropriate concentration. The sputtering is performed in an oxygen atmosphere with the thickness being determined by interference microscopy. The film so deposited may then be recrystallized to the cubic fluorite structure by heating for one hour at temperatures of 1200 to 1400° C. in an inert gas such as argon.

The recrystallization of the electrolyte film at these elevated temperatures ensures that the electrolyte exhibits the cubic fluorite rather than monoclinic crystal structure. In practice, the high-temperature heat treatment for recrystallization may result in a partial dissolution of the electrolyte film in the anode. To eliminate any dissolution that may occur, the anode may be saturated with oxygen prior to the deposition of the film. Approximately 30 atomic percent of oxygen dissolved within the anode is found to be sufficient to eliminate the dissolution of the electrolyte.

The cathode may be sputtered or evaporated on the exposed surface of the electrolyte and the oxygen-donating layer applied thereover. Next, the anode and cathode contacts are applied to complete the cell.

Figure 2:
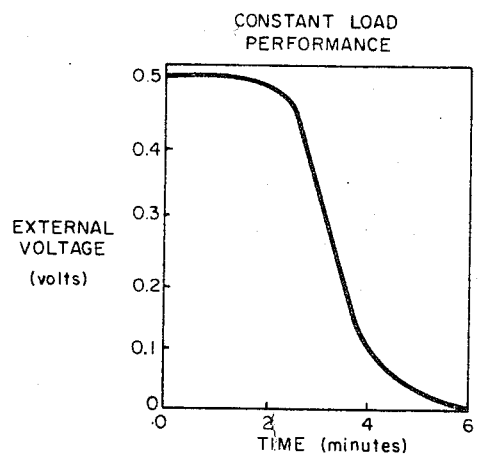
FIG. 2 is a curve showing the constant load performance of the embodiment of FIG. 1.
Figure 3:
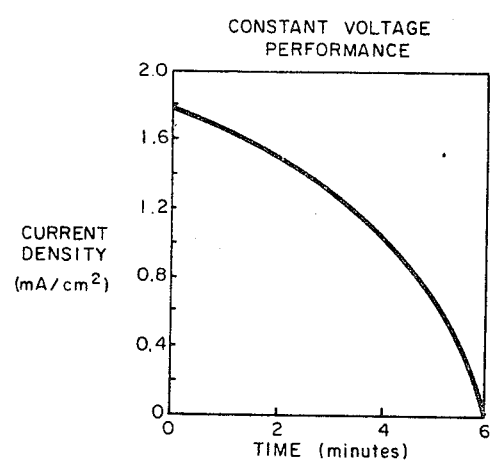
FIG. 3 is a curve showing the constant voltage performance of the embodiment of FIG. 1.

The performance characteristics of galvanic cells constructed in accordance with the embodiment shown in FIG. 1 are shown by the curves of FIGS. 2 and 3. The cells were formed with an anode electrode comprised of a mixture of zirconium and about 18 weight percent of yttrium, an anodic electrolyte film of $(ZrO_2)_{0.9}(Y_2O_3)_{0.10}$ having a thickness of about 2 microns, and a porous evaporated platinum cathode. Oxygen adsorbed on the cathode was used in the operation of these cells. The curve of FIG. 2 shows that the cells are capable of providing an electrochemical voltage under constant load for periods in excess of 2 minutes. Further, the curve of FIG. 3 shows that for a constant voltage, i.e. variable load, the cell is capable of providing substantial amounts of electrical energy over a period of several minutes. In both cases, the activation temperatures were approximately 425° C.

The combination of a number of these galvanic cells to form a battery results in the provision of a compact, rugged thermally-activated energy source having a relatively low activation temperature. While the foregoing description has referred to a specific embodiment of the invention, it will be apparent that many variations and modifications may be made therein without departing from the spirit and scope of the invention.

What is claimed is:
1. A thermally-activated galvanic cell which comprises:
 (a) an anode electrode containing zirconium;
 (b) an electrolyte contacting said anode electrode, said electrolyte being formed of an oxide system having the cubic fluorite structure and an anion transport number of substantially one; and
 (c) an oxygen ion-supplying cathode electrode contacting said electrolyte, the heating of said cell resulting in the transport of oxygen ions from said cathode electrode to said anode electrode whereby the zirconium contained in said anode reacts with said oxygen ions.

2. The galvanic cell in accordance with claim 1 in which said anode electrode contains oxygen dissolved therein.

3. The galvanic cell in accordance with claim 1 in which said anode electrode is formed of a mixture of zirconium and at least one oxidizable constituent of said electrolyte.

4. The galvanic cell in accordance with claim 3 in which said anode electrode contains oxygen dissolved therein.

5. The galvanic cell in accordance with claim 4 in which said electrolyte is formed of an oxide system selected from the group consisting of zirconia-yttria, zirconia-calcia, zirconia-yttria-calcia, thoria-yttria, ceria-lanthana, and hafnia-calcia, and having an anion transport number of at least 0.95.

6. The galvanic cell in accordance with claim 4 in which said electrolyte is a thin film having a resistance of less than 1 ohm at approximately 400° C.

7. The galvanic cell in accordance with claim 4 in which said electrolyte is formed of an oxide system selected from the group consisting of $(ZrO_2)_x(CaO)_{1-x}$, $(ZrO_2)_x(Y_2O_3)_{1-x}$, and $(ZrO_2)_x[(Y_2O_3)(CaO)]_{1-x}$, wherein $x$ is within the mole ratio of 0.95 to 0.65.
wherein $x$ is within the mole ratio of 0.95 to 0.65.

8. The galvanic cell in accordance with claim 7 in which $x$ is within the mole ratio range of 0.95 to 0.85.

9. The galvanic cell in accordance with claim 7 in which said anode electrode is formed of a mixture of zirconium and at least one element selected from the group consisting of yttrium and calcium.

10. The galvanic cell in accordance with claim 9 in which said anode electrode is saturated with oxygen.

11. The galvanic cell in accordance with claim 7 in which said anode electrode is formed of a mixture of zirconium and at least one oxidizable constituent of said electrolyte, the relative weight percent of zirconium in said mixture being equal to the weight percent of zirconia in said electrolyte.

References Cited

UNITED STATES PATENTS

| | | | |
|---|---|---|---|
| 3,057,945 | 10/1962 | Rinnovatore et al. | 136—83 |
| 3,300,344 | 1/1967 | Bray et al. | 136—86 |
| 3,309,233 | 3/1967 | McPheeters et al. | 136—153 |
| 3,374,120 | 3/1968 | Lawson | 136—83 |

WINSTON A. DOUGLAS, Primary Examiner

C. F. LE FEVOUR, Assistant Examiner

U.S. Cl. X.R.

136—86, 120, 153